Oct. 4, 1949.  W. J. BOYER  2,483,875
THERMALLY STABLE COLORIMETER
Filed Aug. 29, 1946  4 Sheets-Sheet 1
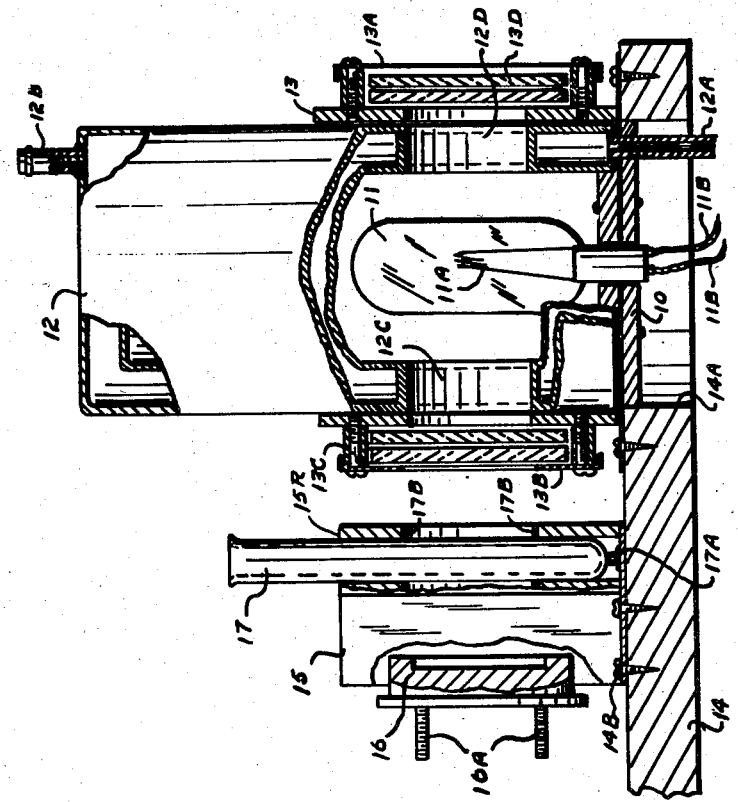
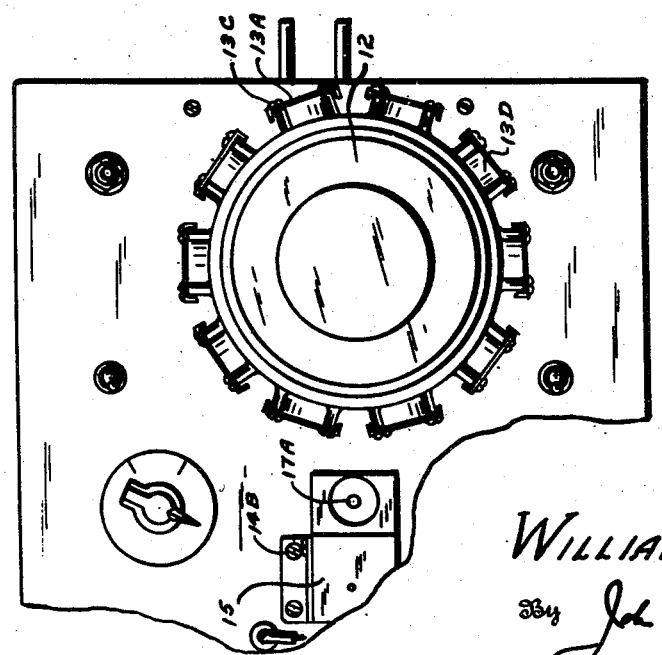
Inventor
WILLIAM J. BOYER
By John Howard Joynt
HIS Attorney

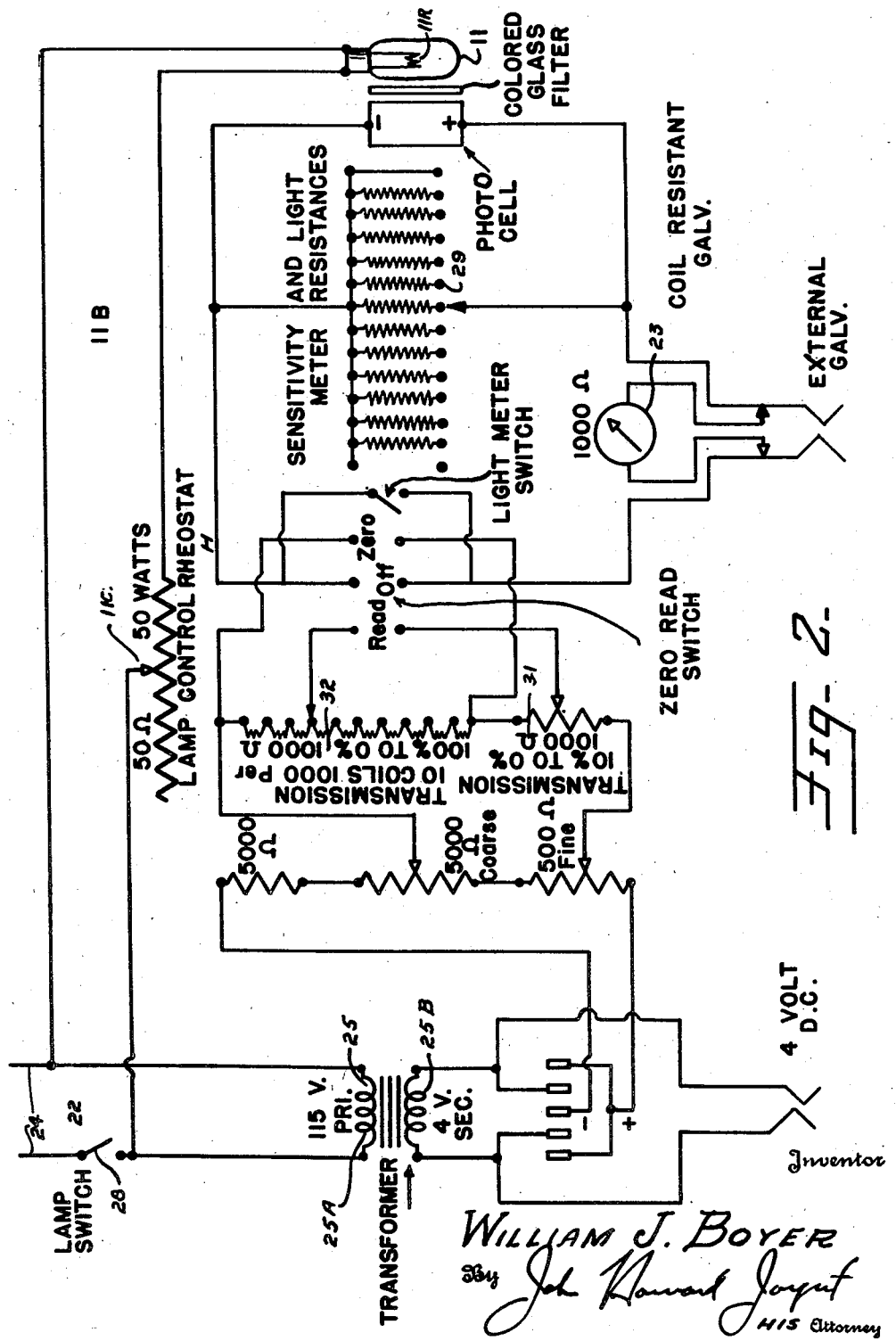

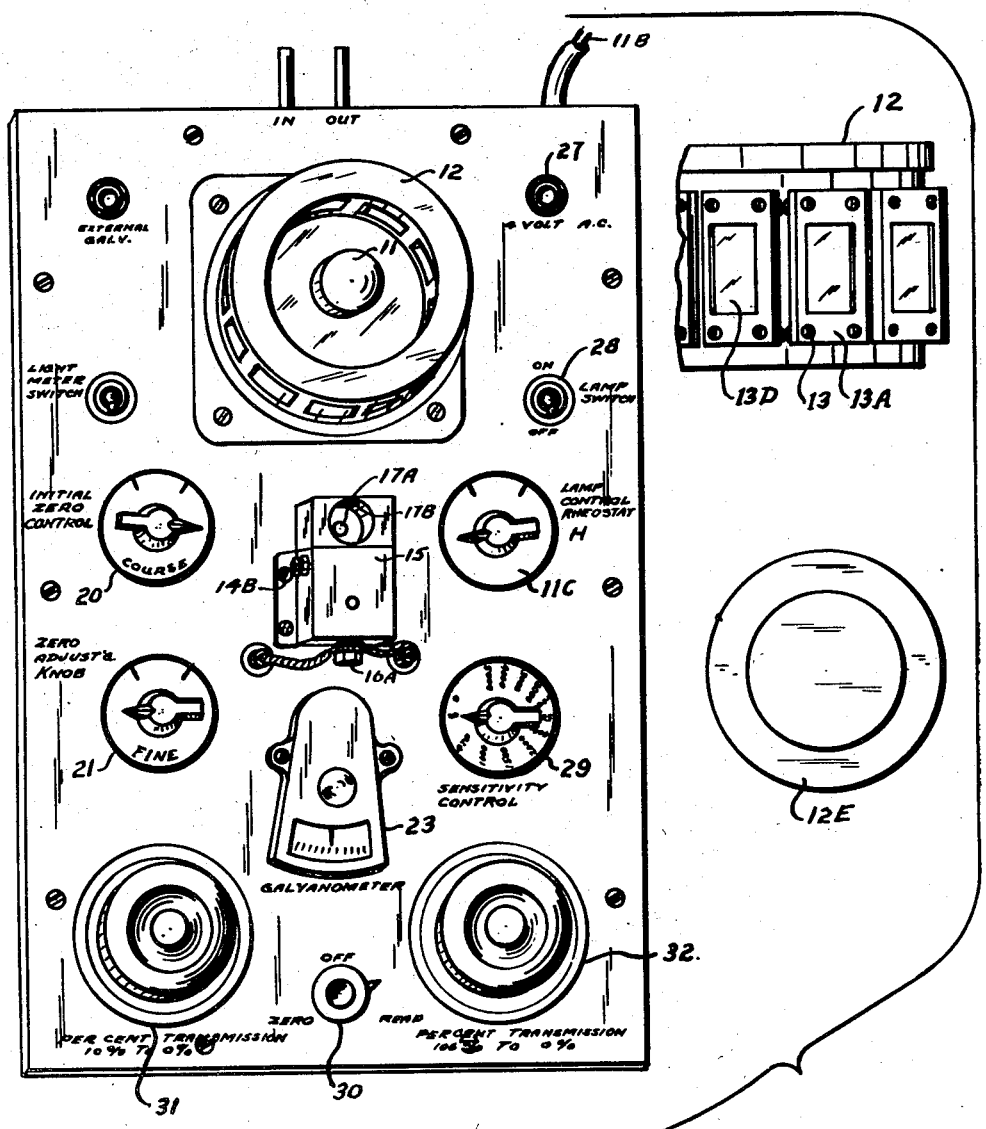

Oct. 4, 1949.  W. J. BOYER  2,483,875
THERMALLY STABLE COLORIMETER
Filed Aug. 29, 1946  4 Sheets-Sheet 4
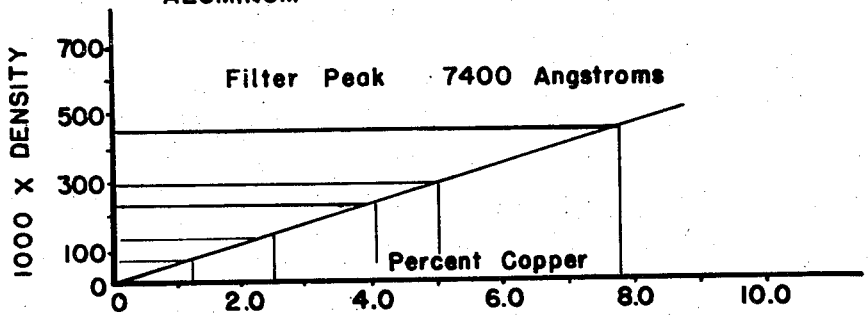
Fig. 5A
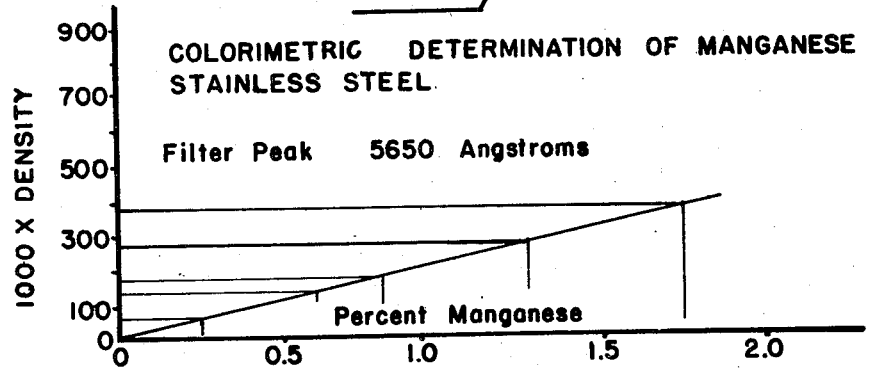
Fig. 5.B.
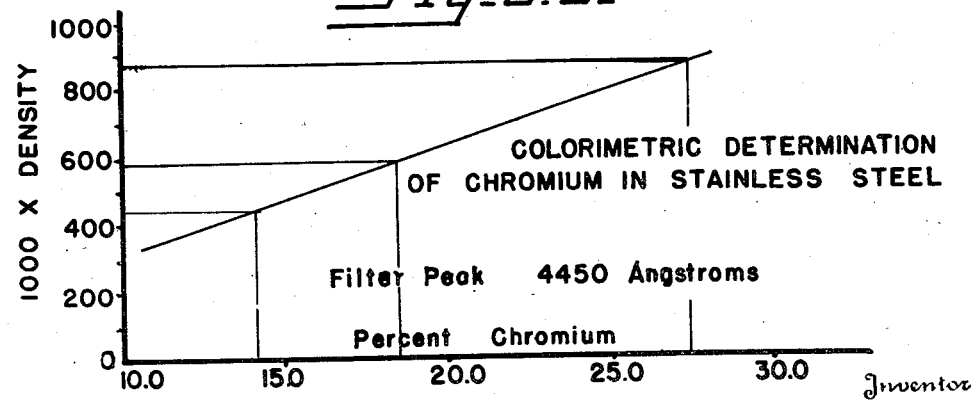
Fig. 5C.
Inventor
WILLIAM J. BOYER
By John Howard Joynt
HIS Attorney Patented Oct. 4, 1949

2,483,875

UNITED STATES PATENT OFFICE 2,483,875

THERMALLY STABLE COLORIMETER

William J. Boyer, Baltimore, Md.

Application August 29, 1946, Serial No. 693,701

5 Claims. (Cl. 88—14)

My invention relates broadly to the field of optics, and more particularly concerns optical apparatus for chemical analyses and allied purposes. More especially, it concerns optical colorimeters.

An important object of my invention is to provide a colorimeter assembly which is compact, rugged and of long useful life, is highly sensitive, gives rise to accurately reproducible results, is both simple and rapid in operation and has wide spectral range.

Another object is to produce a colorimeter assembly in which a maximum quantity of analyzing light is transmitted to the work specimen, in which various combinations of filters can quickly be brought into coincidence with the beam of analyzing light, and in which measurements may thereupon rapidly be consummated.

Still another object resides in the provision of a rapid, simple and accurate mode of determining the quantity of alloy metal in the primary metal in various types of alloys.

Other objects will in part be obvious and in part more fully pointed out hereinafter during the course of the following description, taken in the light of the accompanying drawings.

My invention accordingly resides in the several parts, elements, features of construction and operational steps, as well as in the relation of each of the same with one or more of the others, the scope of the application of all of which is more fully set forth in the claims at the end of this specification.

In the drawings, wherein I have disclosed two embodiments of my invention which I prefer at present, as well as certain charts prepared according to the new method and technique hereinafter pointed out, Figure 1 is a diagrammatic view of one embodiment of my colorimeter, disclosing the construction and arrangement of the several parts of my new apparatus;

Figure 2 is a schematic diagram showing electrical features as embodied in my invention;

Figure 3 shows another embodiment of my colorimeter assembly, with the water jacket and filter holder removed;

Figure 4 is a view similar to Figure 3, but with water jacket and filter holder in assembled position; while Figures 5A, 5B and 5C are illustrative charts used in the determination of the concentration of certain alloy ingredients.

Like reference characters denote like parts throughout the several views.

As conducive to a more thorough understanding of my invention, it may be noted at this time that a long-felt need has existed in various chemical and physical fields, such as in the field of metallurgy, for rapid and accurate methods of determining the compositions of various materials in the course of preparation or undergoing treatment. For example, a typical instance is the determination of the alloy content of a heat of molten metal in say an electric furnace. Such determination must be made rapidly, so that required additives may be charged into the furnace while the heat is still being processed therein.

Over some period of time colorimeters have been developed for undertaking such analyses. It is of course fundamental in this practice to pass the light of a particular frequency through a solution and to measure the absorption effect. Reliance is placed upon the spectroscopic phenomenon of absorption of light of particular wave length by certain metals or other elements, the critical wave lengths thus absorbed varying from element to element. Thus by employing certain filters or combination of filters interposed between a given light source and a fluid solution containing the material, the percentage content of which is to be determined, light of a particular wave length is transmitted through the solution. The absorption of the transmitted light is a measure of the concentration of the particular ingredient.

Many apparatus involving this basic idea have from time to time been introduced on the market. For one reason or another, however, they have interposed practical difficulty in achieving satisfactory results. Where a high output incandescible lamp is employed as the light source, heat radiated therefrom has been found to bring about substantial and unpredictable variance in results. When, on the other hand, a low wattage lamp is employed, a resulting insensitivity is encountered. Moreover, the available light has been substantially limited to the visible spectrum. Advantage could not be had of either the ultraviolet or infra-red ends of the spectrum.

In addition, in prior apparatus, potentiometer difficulties were encountered, the solution of which difficulties, while not forming part of the present invention, are touched upon in this specification.

Bucking of paired photo-electric cells against each other has been suggested to accommodate for variations in the light source during the course of observations, with the thought that the variations would cancel out when two cells were employed. It was found, in operation, however, that inasmuch as the characteristics of no two photo-electric cells are the same, their response to variations in the light source were different, giving rise to substantial and unpredictable error.

Finally, as one of the several illustrative and typical defects hereinbefore encountered in colorimeter practice, it may be noted that time lag is involved in bringing the filter elements employed up to operating temperature in order that equilibrium conditions may be established and maintained, and reproducible results achieved.

An important object of my invention is to avoid in substantial measure many of the aforementioned disadvantages, and at the same time to provide a colorimeter apparatus which is rapid in operation, which employs a light source of high intensity with but little variation in its operating characteristics while energized, in which heat developed by the light source is rapidly dissipated without effect on the characteristics of the optical system, wide spectral range is achieved trespassing on both the ultra-violet and infra-red regions, and the optical system is maintained at all times under thermal equilibrium conditions.

My invention, from the standpoint of apparatus generally may be envisioned as comprising a light source preferably of the filamentary type, centrally disposed in its optical system. Conveniently, of course, a line, as distinguished from a point, source of light may be employed. This illustratively can be accomplished by the use of a lamp having elongated filament. This light source, of whatever type, is of comparatively high intensity, a 100 watt bulb giving satisfactory results. Disposed about this light source in spaced relation thereto is a concentric water jacket through which running water flows. It is of course possible to employ a closed system in which the water is cooled by exterior means such as a fan or the like. Provided in the stationary water jacket are a number of open windows, the geometric centers of which preferably comprise points on horizontal radii from the lamp filament.

Disposed about the water jacket is a rotatable filter carrier, having fixed thereon a number of filter holders equal in number to and having the same angular spacing as the windows in the water jacket. Upon registry of one filter holder with a corresponding window, the other holders will be in registry with corresponding ones of the other windows in the water jacket. Thus at all times the light from the lamp filament passes through the windows through the filters in the filter holders so that thermal equilibrium conditions are established.

Rigidly fixed relative to one of the windows, I provide a holder for the solution undergoing test; while rigidly fixed with reference thereto in radial prolongation from the light source is a photoelectric cell connected with a potentiometer. Potentiometer readings, as interpreted by a previously prepared chart, indicate the required analysis.

And now having reference more particularly to the embodiment of my invention illustratively disclosed in Figure 1, I provide a stationary base 10 for the incandescible lamp 11. The filament 11A of this lamp is energized through a suitable 110–120 volt circuit, the leads 11B, 11B of which are disclosed in the drawings. In the present embodiment I employ an alternating current energizing source, although of course a direct current is equally feasible.

The lamp is of the high intensity concentrated filament type, and serves as a focal point of the optical system. Conveniently, it is of high watt rating. This lamp 11 is also shown in the embodiment of Figures 2 and 3. Surrounding the lamp 11, I provide a fixed water jacket 12 as more particularly shown, one embodiment in Figure 1 and another embodiment in Figure 3. Referring more particularly to the embodiment of Figure 1, this water jacket 12 is carried, restrained against movement, on the base 10. A water inlet 12A is provided at the bottom, in the lower righthand corner of Figure 1. Cool water, led in at this point, circulates through the water jacket 12, and is discharged as exhaust water at the exhaust conduit 12B disposed at the top of the water jacket at the right in Figure 1. In Figures 3 and 4 water jacket 12 is simply a sleeve, open at the top, and adapted to be closed by lid or cover 12E. In this case exhaust conduit 12B is disposed laterally on the upper part of the sleeve 12.

It will be seen that the filament 11A of the lamp 11 serves as a high intensity source of illumination. Because of the high intensity and high energy output of this filament, centering in the white part of the visible spectrum, that is, about the middle thereof, copious quantities of light are emitted. This is true of both the visible range and as well, the bordering portions of the infra-red and ultra-violet spectrum.

As has been explained hereinbefore, the light source 11 and the water jacket 12 are associated in a fixed optical system with a cooperating photo-electric cell and a removable specimen holder. Inasmuch as it is important that the optical system be centered along a fixed line or axis, be it horizontal, vertical or at any selected angle thereto, it would appear that a single window would suffice in the water jacket, properly located and centered with respect to the lamp filament, for the transmission of the working light beam. Such window for example is illustrated at 12C in Figure 1.

To bring the associated filters which are provided in cooperation with the corresponding window in registry therewith in manner hereinafter more specifically set forth, and to bring these filters permanently to proper operating or equilibrium thermal conditions, however, all in a manner as will more fully hereinafter be pointed out, I provide a number of such windows 12D disposed at equal angular spacing about the periphery of the water jacket. These windows are all of the same size, with geometric centers on horizontal radii from the filament 11A of the lamp 11. Thus, inasmuch as the radiation from the filament 11A is in all directions, light will be transmitted equally through the other windows 12D, at the same time and in equal quantity as is transmitted through the window 12C.

The filters in a suitable filter carrier are in registry with corresponding windows 12D while the working filter is in registry with the working window 12C. These standby filters are thereby brought to operating temperature so that it requires but a moment to bring a new filter into registry with window 12C and to insert a new test specimen in the specimen holder. Equilibrium conditions thereupon maintain. Working time is reduced to a minimum. Maximum light transmission from the light source to the filter is effected by centering the windows 12C and 12D relative to the filament 11A.

Accordingly, I dispose about the water jacket 12 a filter carrier 13 having a plurality of filter stands or holders 12A thereon, equal in number to the windows 12C and 12D in the water jacket 12, and disposed with equal radial spacing about the filter holder. The geometric centers of the filter holders 13A are in coincidence with the radial centers of the windows 12C and 12D. As is perhaps better shown in Figures 3 and 4, in each holder the filters, either alone or in selected sets, are retained by face plates 13B which are held down by bolts 13C into the carrier 13. By proper selection of the filters or combination of filter elements 13D and with ten or more filter combinations possible, the equipment is rapidly adapted for the particular type of investigation undergoing. The filter carrier 13 has an internal diameter slightly greater than the external diameter of the water jacket 12. Shaped as a sleeve, it can be rotated as an ordinary journal bearing, or if desired, a suitable thrust bearing of anti-friction type may be provided at the base of the filter carrier carrying the same. In practice, however, I find that such thrust bearing is not required, although it provides a desirable refinement.

Since the number of filter holders 13B on the filter carrier 13 is equal to the number of windows in the water jacket 12, and since the angular spacing is the same, registry of one filter holder with a corresponding window insures that all other filter holders will be in exact registry with the corresponding windows of the jacket 12.

A base 14, here shown as wood but conveniently of plastic, metal or other suitable materials, serves to hold and integrate the remainder of the optional system, as well carries the water jacket 12 and lamp assembly 11 through a bore 14A let into the same (Figure 1). A holder for the photo-electric cell and a test tube carrying the specimen undergoing test is designated at 15, and is fast to base 14 by suitable means, here shown as bolts 14B. The photoelectric cell itself, indicated generally at 16, is suitably let into the carrier 15. The single form of photo-electric cell 16 is of conventional type such as is readily found on the market. Centering bushings 17B, 17B are provided in the test tube holder portion 15A of the combined holder 15. Vertically spaced from each other, these center the test tube or other specimen holder 17 in required rigid manner, accurately positioning the same properly with respect to the beam of light transmitted axially from the filament 11A to the optional center of the photo-electric cell 16. A resilient stud 17A is provided at the bottom of the test tube-receiving well 15A to facilitate cushioning and centering the test tube 17. Connectors 16A are provided for connecting the photo-electric cell to a potentiometer or galvanometer indicating means. It is entirely practical to employ for this purpose a photo-electric cell, preferably of the barrier layer type.

In operation, it will be seen that lamp 11 of my colorimeter is completely surrounded by the hollow water jacket or housing 12 through which circulating water flows at all times. Uniform thermal equilibrium conditions maintain. The many windows 12C and 12D are disposed equally spaced about the periphery of the jacket 12. While the size of these windows is not important in itself, the vertical position of the geometric centers of the windows in the jacket is important. These centers must be approximately horizontally positioned in a line with the lamp filament to permit the windows to transmit maximum quantity of light. The filter carrier 13 carries a plurality of filter holders 13A which are at all times maintained in registry with the corresponding windows. A fixed optical system includes the photo-electric cell and specimen holder, and the specimen holder itself, indicated generally at 17. Light is transmitted from the lamp filament 11A through the windows 12C and 12D and through the operating filter members. The tubular filter carrier 13, having an inside diameter slightly larger than the external diameter of the water jacket 12, is so mounted that it can be rotated completely in either clockwise or counter-clockwise direction. The windows of the water-cooled lamp housing or water jacket 12 and tubular filter carrier 13 permits each filter or set of filters to be preheated by the radiated energy of the lamp. Each filter or combination of filters is at all times ready for use in taking an observation with any of the spectral bands according to the particular characteristic of each filter.

Employing a single photo-electric cell arrangement which I find to give rise to the most satisfactory results, any of the filters or combination of filters may be employed simply by rotating the tubular filter carrier 13 until the desired filter assembly is presented directly in the path of the light beam from the photo-electric cell at window 12C. The color filters may have surfaces which are either molded or polished. I advantageously employ frosted surfaces. While these somewhat reduce the quantity of light which is transmitted, a much more uniform light beam is presented for scanning the contents of the test tube.

As has been stated, the holder 15 for the photo-electric cell and the glass test tube 17 containing the liquid whose degree of light transmission is undergoing measurement, is mounted so that it is directly in the path of the light radiating from the working window 12C of the lamp housing. This light has passed through the cooperating set of filters 13D before it reaches the holder 15. I measure the output of the photo-electric cell through a potentiometer circuit, which as has been stated, may be of conventional design. When employing the potentiometer circuit as shown in Figure 2, however, the readings indicative of the light absorption (or expressed in other terms, percent of light transmission) are obtained from two dials forming an integral part of the potentiometer. One of these, dial 20 (Figures 3 and 4) is for coarse adjustment and one, dial 21, for fine adjustment. The dial 20 indicates in ten steps of ten percent each over a linear range of 100%, while the fine dial 21 gives readings through a range of ten percent in graduations of one hundred equal parts, each graduation thus indicating one-tenth of one percent. As a practical matter, readings can readily be obtained within one-half of these readings.

Referring more particularly to Figures 2 and 3 it will be seen that the main current leads 24 have branched therefrom the lamp energizing circuit 11B, and as well, energize the primary 25A of a step-down transformer 25. The iron core transformer 25 steps down from a 115 volt primary to a rated 4 volt secondary output at secondary 25B. The plug-in for the 4 volt secondary is shown at 27 in Figure 3. Moreover, lamp switch 28 is provided for closing the primary energizing circuit. A lamp-control rheostat 11C provides accurate and sensitive control of the energization of the filament 11A of lamp 11. The sensitivity and light meter resistances are controlled through manually operable rheostat 29. The control button for the galvanometer 23 is indicated at 30, while the knob for controlling the transmission from 10% to 0% is indicated at 31 while that for transmission from 100% to 0% is disclosed at 32.

I have found that entirely satisfactory results have been obtained in the blue, green and red portions of the spectrum. Moreover, these readily reproducible results have been demonstrated both for solutions of low ion concentration and for those of extremely high ion concentrations. Such high concentration solutions have absorbed as much as ninety-five percent of the initial light, good reproducibility nevertheless being displayed.

In making an analysis with my new equipment, the lamp source is energized, as by closure of a suitable electric switch 22 (Figure 2). Conveniently, I provide a control rheostat, not shown, in circuit with the lamp. Water supply is started through the water jacket. I find that, dependent upon the inherent temperature of the water, a flow of approximately five gallons per hour usually is entirely sufficient. The filter carrier 13 is rotated until the proper combination of filters is placed in registry with the working window 12C of the jacket 12. The heat from the light source 11A simultaneously brings all of the filter combinations into thermal equilibrium.

A test tube 17 holds the solution undergoing test, and is inserted in the holder 16 and is stabilized in position by the stud 17A and bushings 17B. Before inserting the test tube 17, however, the potentiometer is balanced to an equilibrium position with zero scale reading on galvanometer 23 (Figure 2). After insertion of the test tube and upon establishment of unbalanced conditions in the potentiometer occasioned by light absorption in the solution in the test tube, which light is no longer incident on the photo-electric cell, the potentiometer is re-balanced to zero and the scale measurements determine the degrees of absorption within test tube solution.

A curve has theretofore been plotted using standard solutions, so that by interpolating or extrapolating, as the case may be, the experimental data on the standard curves, the concentration of the solution and its particular ingredients undergoing analysis can readily be determined.

Inasmuch as the filters are always in thermal equilibrium, it is a matter of but a moment to remove the particular test tube, the contents of which are undergoing observation, and to replace it with another test tube containing a solution to be analyzed. By selecting the proper filter or combination of filters and by rotating the carrier 13 until that filter or filters are brought into registry with the window 12C, new observations can be made almost instantaneously. The foregoing description necessarily has been somewhat generalized in nature.

It is now in order to consider the application of my invention to certain specific problems of analysis. These are discussed in connection with the charts, Figures 5A, 5B and 5C.

EXAMPLE 1

*Colorimetric determination of copper in aluminum*

Transfer a 0.10-g. sample to a 125-ml. Erlenmeyer flask. Treat the sample with 15 ml. of a mixture of nitric acid (sp. gr. 1.42) and hydrochloric acid (sp. gr. 1.19) (1+1). After solution of the sample, add 5 drops of hydrofluoric acid (sp. gr. 1.15) and 15 ml. of perchloric acid (sp. gr. 1.66) (1+1). Evaporate the solution just to dryness. Cool the flask and its contents; add exactly 10 ml. of diluted hydrochloric acid (3+1).

When all the salts have dissolved, transfer the solution to a glass cell tube and measure the percent transmission of this solution with a filter peaked at 7400 Angstroms. Record the percent transmission as the color reading. Add 2 to 4 drops of a 10 percent stannous chloride solution in diluted hydrochloric acid (3+1). Mix the solution thoroughly until all the cupric chloride is reduced to cuprous chloride. Measure the percent transmission of this solution and record as the reference reading. Convert the color and reference reading to density values by the relation of $D = 2 - \log T$. Subtract the reference value from the color value, multiply by 1000 and with this figure as the ordinate read the amount of copper in percent from the graph of Figure 5A.

The data on which Figure 5A is based is given in Table I, as follows:

TABLE I

*Copper in aluminum*

[The colored glass filter employed is peaked at 7400 Angstroms. For this purpose there is used Corning Glass Works filter No. 5850 (4.15 mm.) and filter No. 2412 (4.0 mm.).]

| Sample | Per Cent Cu | Reference | | Color | | 1000 X Density Difference |
|---|---|---|---|---|---|---|
| | | T | D | T | D | |
| 1 {0.05-g. NBS 44c / .05-g. NBS 85e} | 1.24 | 86.3 | 0.064 | 73.6 | 0.133 | 69 |
| 2 0.10-g. NBS 85e | 2.48 | 86.3 | .064 | 61.7 | .210 | 146 |
| 3 {0.05-g. NBS 85e / .05-g. NBS 86b} | 3.91 | 87.3 | .059 | 51.9 | .285 | 226 |
| 4 {0.05-g. NBS 85e / .05-g. NBS 86b} | 5.18 | 87.9 | .056 | 44.0 | .356 | 300 |
| 5 0.10-g. NBS 86b | 7.67 | 86.9 | .061 | 31.0 | .509 | 448 |

EXAMPLES 2 AND 3

*Colorimetric determination of manganese and chromium in stainless steels*

As reagent, silver nitrate solution is employed,

TABLE II

*Manganese in stainless steel*

[The filter is peaked at 5650 Angstroms using for this purpose a combination Corning Glass Works filters No. 9780 (5.14 mm.), No. 4305 (3.8 mm.), and No. 3482 (2.75 mm.).]

| | Sample | Sample Weight | Percent Mn | Percent Cr | Percent Ni | Reference Color | | | | 1000 × Density Difference |
|---|---|---|---|---|---|---|---|---|---|---|
| | | | | | | T | D | T | D | |
| 1 | NBS 732 | Grams 0.20 | 0.25 | 14.09 | 0.16 | 94.3 | 0.025 | 82.6 | 0.063 | 58 |
| 2 | NBS 101b | .20 | .60 | 18.50 | 8.99 | 93.5 | .029 | 67.9 | .168 | 139 |
| 3 | NBS 133 | .20 | .80 | 13.59 | .29 | 95.8 | .019 | 62.4 | .205 | 186 |
| 4 | NBS 121a | .20 | 1.28 | 18.68 | 10.58 | 94.0 | .027 | 49.0 | .310 | 283 |
| 5 | USN 3101 | .20 | 1.76 | 27.15 | 22.12 | 92.3 | .035 | 38.1 | .419 | 384 | obtained by dissolving 10 grams of silver nitrate in 1000 ml. of distilled water, the solution being filtered before use. Ammonium persulfate is obtained by dissolving 75 grams of ammonium persulfate in 250 ml. of distilled water. Since ammonium persulfate solution decomposes upon aging, it should be freshly prepared each morning.

In carrying this procedure into effect, transfer a 0.20 gram sample to a 250 ml. Erlenmeyer flask, and dissolve the same by treating it with 15 ml. of a mixture of nitric acid (sp. gr. 1.42) and hydrochloric acid (sp. gr. 1.19) (1+1). After solution of the sample add two drops of hydrofluoric acid (sp. gr. 1.15) and 7 ml. of perchloric acid (sp. gr. 1.66) (1+1). Evaporate the solution until the perchloric acid vapors condense freely in the neck of the flask and until all of the chromium appears to be oxidized to chromic acid. Cool the flask and its contents, add 80 ml. of water, 5 ml. sulfuric acid (sp. gr. 1.84) 5 ml. phosphoric acid (sp. gr. 1.69), 10 ml. of the silver nitrate solution and 10 ml. of ammonium persulfate solution. Bring the solution to a boil and boil for 0.5 minute. Cool the flask and its contents to room temperature and dilute to 200 ml. with distilled water. Transfer approximately 10 ml. of the diluted solution to a glass cell tube and measure the percent transmission of this solution with a filter combination peaked at 5650 Angstroms (for the glass filter combination used see the data given below establishing the graphs of Figures 5B and 5C). Remove the glass cell tube containing the solution, turn the "zero-read" switch to the "zero" position, and note whether the galvanometer returns to the "zero" position. If the initial "zero" has reproduced, it will not be necessary to measure the transmission of the solution a second time. Add two drops of mercurous nitrate solution to the glass cell tube, mix the solution well, and again measure the transmission with the same colored glass filter combination. Convert the reading obtained to per cent manganese by the chart of Figure 5B, the obtained reading multiplied by 1000 being taken as the ordinate and the per cent manganese then being directly read from the abscissa.

The solution remaining in the glass cell tube will serve to determine chromium in the sample. Use the colored glass filter combination shown in the attached graph and measure the percent transmission of this solution, convert this single percent transmission value to the density value by means of chart 5C, with the observed value multiplied by 1000 being taken as the ordinate; the percent chromium is directly given as the abscissa.

The test data on which Figure 5B is based is given in Table II as follows:

The test data on which Figure 5C is based is given in Table III as follows:

TABLE III

*Chromium in stainless steel*

[The filter here is peaked at 4450 Angstroms. There is used a combination of Corning Glass Works filter No. 5443 (6.0 mm.) and No. 3389 (3.65 mm.)]

| Sample | Sample Weight | Percent Cr | Percent Ni | Percent Transmission | 1000 × Density |
|---|---|---|---|---|---|
| NBS 73a | Grams 0.20 | 14.09 | 0.16 | 36.0 | 444 |
| NBS 101b | .20 | 18.50 | 8.99 | 26.1 | 583 |
| NBS 133 | .20 | 13.59 | .29 | 37.4 | 427 |
| NBS 121a | .20 | 18.68 | 10.58 | 25.85 | 587 |
| USN 3101 | .20 | 27.15 | 22.12 | 13.3 | 876 |

It is at once apparent from the foregoing that my new construction admirably fulfills its intended purpose. The use of a high intensity lamp insures ample light emission for highly sensitive photo-electric cell reaction. Moreover, the increased radiation in the invisible spectrum as well as in the visible spectrum establishes a wide field of utilization of the colorimeter apparatus. By careful selection of the color filter or stack of filters in each filter holder 13A, the apparatus is suitable for ready determination of nearly all analyses encountered in the particular line of work. Because the water-cooled jacket is employed, the fluctuations resulting from thermal variations are avoided. When it is considered that heretofore it was these thermal variations which made the use of a single photoelectric cell undesirable where light sources were employed of sufficient intensity to give rise to sensitive results, it becomes apparent that a substantial advance in the art is achieved through the establishment of thermal equilibrium conditions.

Inasmuch as the light filter or stack of filters are maintained at operating temperatures, but little time is expended in bringing the assembly into condition for operation and this only at the very outset. Thus, with quick achievement of operating stability, permitting rapid and early readings, it is nevertheless observed that readings taken in the experimental laboratory during the progress of a particular project may thereafter be reproduced faithfully in the commerical testing laboratory. For this reason charts may be prepared in the experimental laboratory which serve as a basis for immediate determination of the metal contents in the commercial laboratory.

With the use of but a single photo-electric cell any of the filters or stacks of filters may be employed simply by rotating the tubular filter carrier until the desired filter is presented directly in the path of the light radiated to the photo cell. It is to be noted that only a small quantity of cooling fluid need flow through the water jacket 12 to insure desired results. It is observed that with proper operation, the high intensity light source 11, even though maintained within confined spaces, has a life expectancy which is entirely satisfactory and is a minimum of about 500 hours.

All these and many other highly satisfactory results attend upon the practice of my invention. Accordingly, and inasmuch as many modifications will readily occur to those skilled in the art, once the broad aspects of my invention are disclosed, all falling within the scope thereof, and further, since many embodiments of the basic idea will likewise suggest themselves, I intend the foregoing disclosure to be construed as purely illustrative and not by way of limitation.

I claim as my invention:

1. A colorimeter comprising, in combination, an intense source of illumination concentrated in the visible spectrum, a multi-windowed water jacket disposed about said light source as a center, and a filter carrier disposed rotatably with reference to said water jacket in close proximity thereto, having a plurality of filter holders thereon in number and spacing equal to the windows in the water jacket so that upon registry of one filter holder with a corresponding window the other filter holders will be in registry with the corresponding other windows.

2. In a colorimeter, the combination of a centrally disposed concentrated light source, a tubular water jacket centering about said light source in spaced relation thereto and having inlet and outlet for circulating water through said water jacket, said water jacket having a plurality of windows disposed about its longitudinal periphery and a filter carrier snugly carried exteriorly to said water jacket and having filter holders therein equal in number and angular spacing to the windows in said water jacket, whereby registry of one filter holder with one window will insure registry of all other filter holders with corresponding windows.

3. In a colorimeter assembly, in combination, a cylindrical water jacket having a plurality of windows disposed peripherally thereabout with equal angular spacing to permit the passage of light therethrough, and a filter carrier rotatably disposed around said water jacket to permit the two being rotated relative to each other, said filter carrier having filter holders equal in number to and with the same angular spacing as the windows on the water jacket.

4. In a colorimeter, the combination of an intense source of illumination concentrated in the visible spectrum, a windowed water jacket disposed about said light source as a center, a filter carrier disposed rotatably with reference to said water jacket in close proximity thereto, and a plurality of filter holders on said carrier in registry with the windowed portion of the water jacket whereby light from said source passes through said filter holders.

5. In a colorimeter, the combination of means for supporting a source of illumination, a windowed water jacket centering about the source of illumination supported in said supporting means, a filter carrier rotatably journaled about said water jacket and in close proximity thereto, and filter holders on said carrier registering with the windowed portion of said water jacket whereby light from the source of illumination supported in said supporting means passes through said filter holders.

WILLIAM J. BOYER.

REFERENCES CITED

The following references are of record in the file of this patent:

UNITED STATES PATENTS

| Number | Name | Date |
|---|---|---|
| 1,147,501 | Genter | July 20, 1915 |
| 1,729,239 | Anderson | Sept. 24, 1929 |
| 2,193,437 | Summerson | Mar. 12, 1940 |
| 2,273,356 | Holven et al. | Feb. 17, 1942 |
| 2,282,741 | Parker | May 12, 1942 |
| 2,356,238 | Gillett et al. | Aug. 22, 1944 |
| 2,424,858 | Senn | July 29, 1947 |